United States Patent
Oh et al.

(10) Patent No.: US 11,069,943 B2
(45) Date of Patent: Jul. 20, 2021

(54) ELECTRODE ASSEMBLY COMPRISING ELECTRODE LEAD COUPLED TO LONG-SIDE AREA

(71) Applicant: LG Chem, Ltd., Seoul (KR)

(72) Inventors: Sei-Woon Oh, Daejeon (KR); Hyun-Min Kim, Daejeon (KR); Seong-Yoon Lim, Daejeon (KR); Sun-Hwak Woo, Daejeon (KR)

(73) Assignee: LG Chem, Ltd.

( * ) Notice: Subject to any disclaimer, the term of this patent is extended or adjusted under 35 U.S.C. 154(b) by 192 days.

(21) Appl. No.: 16/327,721

(22) PCT Filed: Nov. 6, 2017

(86) PCT No.: PCT/KR2017/012494
§ 371 (c)(1),
(2) Date: Feb. 22, 2019

(87) PCT Pub. No.: WO2018/117407
PCT Pub. Date: Jun. 28, 2018

(65) Prior Publication Data
US 2019/0181415 A1    Jun. 13, 2019

(30) Foreign Application Priority Data
Dec. 21, 2016    (KR) .......................... 10-2016-0175294

(51) Int. Cl.
*H01M 50/531*    (2021.01)
*H01M 10/0585*    (2010.01)
(Continued)

(52) U.S. Cl.
CPC .......... *H01M 50/531* (2021.01); *H01M 10/04* (2013.01); *H01M 10/0585* (2013.01);
(Continued)

(58) Field of Classification Search
CPC .......... H01M 2/26; H01M 2/30; H01M 2/202; H01M 10/04; H01M 10/0585;
(Continued)

(56) References Cited

U.S. PATENT DOCUMENTS 8,968,910 B2 *   3/2015   Kim .................. H01M 10/0413
                                                                         429/153
9,246,154 B2 *   1/2016   Ryu ...................... H01M 50/54
(Continued)

FOREIGN PATENT DOCUMENTS

CN      201616479 U    10/2010
CN      102082256 A     6/2011
(Continued)

OTHER PUBLICATIONS

Extended European Search Report for Application No. EP 17883447.9 dated Jun. 24, 2019, pp. 1-7.
(Continued)

*Primary Examiner* — Milton I Cano
*Assistant Examiner* — Suphia Quraishi
(74) *Attorney, Agent, or Firm* — Lerner, David, Littenberg, Krumholz & Mentlik, LLP (57) ABSTRACT

Disclosed herein is an electrode assembly configured to have a rectangular structure including two long sides and two short sides when viewed in a plan view, wherein the electrode assembly includes positive electrode tabs protruding from two or more regions of a first long side that are spaced apart from each other, the first long side being one of the two long sides, and negative electrode tabs protruding from two or more regions of a second long side that are spaced apart from each other, the second long side being the other of the two long sides, and wherein the positive electrode tabs are coupled to a positive electrode lead located at the first long
(Continued)

side whereas the negative electrode tabs are coupled to a negative electrode lead located at the second long side.

11 Claims, 3 Drawing Sheets

(51) Int. Cl.
| | |
|---|---|
| *H01M 10/04* | (2006.01) |
| *H01M 50/543* | (2021.01) |
| *H01M 50/545* | (2021.01) |
| *H01M 50/553* | (2021.01) |
| *H01M 50/548* | (2021.01) |
| *H01M 50/54* | (2021.01) |
| *H01M 50/55* | (2021.01) |
| *H01M 50/538* | (2021.01) |

(52) U.S. Cl.
CPC ......... *H01M 50/538* (2021.01); *H01M 50/54* (2021.01); *H01M 50/543* (2021.01); *H01M 50/545* (2021.01); *H01M 50/548* (2021.01); *H01M 50/55* (2021.01); *H01M 50/553* (2021.01)

(58) Field of Classification Search
CPC .. H01M 50/531; H01M 50/543; H01M 50/54; H01M 50/548; H01M 50/545; H01M 50/55; H01M 50/538; H01M 50/553
USPC .......................................................... 429/163
See application file for complete search history.

(56) References Cited

U.S. PATENT DOCUMENTS

| | | | | |
|---|---|---|---|---|
| 9,379,371 | B2* | 6/2016 | Ahn | H01M 50/172 |
| 9,466,821 | B2* | 10/2016 | Wang | H01M 50/209 |
| 9,640,792 | B2* | 5/2017 | Jung | H01M 50/543 |
| 10,026,944 | B2* | 7/2018 | Ryu | H01G 11/06 |
| 2005/0089751 | A1* | 4/2005 | Oogami | H01M 10/0413 |
| | | | | 429/162 |
| 2006/0093906 | A1* | 5/2006 | Yamashita | B32B 27/32 |
| | | | | 429/176 |
| 2007/0037051 | A1* | 2/2007 | Kim | H01M 50/20 |
| | | | | 429/151 |
| 2008/0286635 | A1* | 11/2008 | Seino | B32B 7/12 |
| | | | | 429/94 |
| 2008/0292952 | A1* | 11/2008 | Yanagihara | H01M 10/0585 |
| | | | | 429/162 |
| 2009/0317717 | A1* | 12/2009 | Ryu | H01G 11/06 |
| | | | | 429/211 |
| 2010/0248030 | A1* | 9/2010 | Ryu | H01G 11/06 |
| | | | | 429/211 |
| 2011/0117438 | A1* | 5/2011 | Han | H01M 4/74 |
| | | | | 429/246 |
| 2011/0129711 | A1* | 6/2011 | Ahn | H01M 50/116 |
| | | | | 429/94 |
| 2011/0244287 | A1* | 10/2011 | Kim | H01M 50/116 |
| | | | | 429/94 |
| 2012/0121965 | A1* | 5/2012 | Makino | H01M 4/70 |
| | | | | 429/156 |
| 2012/0129026 | A1* | 5/2012 | Wu | H01M 10/6551 |
| | | | | 429/99 |
| 2013/0143109 | A1* | 6/2013 | Kim | H01M 10/0413 |
| | | | | 429/178 |
| 2013/0196210 | A1* | 8/2013 | Kim | H01M 10/0585 |
| | | | | 429/153 |
| 2013/0209868 | A1* | 8/2013 | Suzuta | B32B 7/02 |
| | | | | 429/176 |
| 2014/0030579 | A1* | 1/2014 | Kim | H01M 50/54 |
| | | | | 429/153 |
| 2014/0087224 | A1* | 3/2014 | Kim | H01M 10/0585 |
| | | | | 429/94 |
| 2014/0212697 | A1* | 7/2014 | Wang | H01M 50/502 |
| | | | | 429/7 |
| 2014/0370338 | A1* | 12/2014 | Lim | H01M 50/581 |
| | | | | 429/62 |
| 2015/0044536 | A1* | 2/2015 | Kwon | H01M 10/04 |
| | | | | 429/94 |
| 2015/0072204 | A1* | 3/2015 | Kwon | H01M 10/0436 |
| | | | | 429/94 |
| 2015/0072205 | A1* | 3/2015 | Jung | H01M 50/543 |
| | | | | 429/94 |
| 2015/0280275 | A1* | 10/2015 | Aizawa | H01M 10/0431 |
| | | | | 429/94 |
| 2015/0380717 | A1* | 12/2015 | Ryu | H01M 50/54 |
| | | | | 429/211 |
| 2016/0043375 | A1* | 2/2016 | Saitoh | H01M 10/0436 |
| | | | | 429/152 |
| 2016/0099456 | A1* | 4/2016 | Kwon | H01M 6/46 |
| | | | | 429/94 |
| 2016/0218386 | A1* | 7/2016 | Park | H01M 50/543 |
| 2016/0308177 | A1* | 10/2016 | Jang | H01M 50/538 |
| 2016/0329546 | A1* | 11/2016 | Ham | H01M 10/0585 |
| 2017/0194606 | A1* | 7/2017 | Lim | H01M 10/058 |
| 2017/0214028 | A1* | 7/2017 | Oh | H01M 10/0525 |
| 2019/0181415 | A1* | 6/2019 | Oh | H01M 50/531 |
| 2019/0207276 | A1* | 7/2019 | Buck | H01M 50/10 |
| 2019/0379012 | A1* | 12/2019 | Mizuguchi | H01M 50/124 |
| 2020/0381774 | A1* | 12/2020 | Ueno | H01M 50/131 |

FOREIGN PATENT DOCUMENTS

| | | |
|---|---|---|
| CN | 102956924 A | 3/2013 |
| EP | 2337118 A1 | 6/2011 |
| JP | 2006252802 A | 9/2006 |
| JP | 2016110947 A | 6/2016 |
| KR | 20080009353 A | 1/2008 |
| KR | 20100135382 A | 12/2010 |
| KR | 20130119457 A | 10/2013 |
| KR | 20130139472 A | 12/2013 |
| KR | 20140083344 A | 7/2014 |
| KR | 20140097731 A | 8/2014 |
| KR | 20140110136 A | 9/2014 |
| KR | 20160010080 A | 1/2016 |
| KR | 20160108115 A | 9/2016 |
| KR | 20160108857 A | 9/2016 |
| KR | 20160119509 A | 10/2016 |

OTHER PUBLICATIONS

International Search Report for PCT/KR2017/012494 dated Mar. 21, 2018.
Search Report from First Office Action in Chinese Application No. 2017800455278 dated Apr. 25, 2021; 3 pages.

* cited by examiner

ELECTRODE ASSEMBLY COMPRISING ELECTRODE LEAD COUPLED TO LONG-SIDE AREA

CROSS-REFERENCE TO RELATED APPLICATIONS

This application is a national phase entry under 35 U.S.C. § 371 of International Application No. PCT/KR2017/012494, filed on Nov. 6, 2017, published in Korean, which claims priority to Korean Patent Application No. 10-2016-0175294, filed on Dec. 21, 2016, the disclosures of which are hereby incorporated herein by reference.

TECHNICAL FIELD

The present invention relates to an electrode assembly including an electrode lead coupled to a long side thereof.

BACKGROUND ART

As energy prices are increasing due to the depletion of fossil fuels and increasing attention is being paid to environmental pollution, the demand for environmentally friendly alternative energy sources is bound to play an increasing role in the future. Thus, research into techniques for generating various kinds of power, such as nuclear energy, solar energy, wind energy, and tidal power, is underway, and power storage apparatuses for more efficient use of the generated energy are also drawing much attention.

In particular, the demand for secondary batteries as energy sources is rapidly increasing as mobile device technology continues to develop and the demand for such mobile devices continues to increase. Accordingly, much research into batteries satisfying various needs has been carried out.

Typically, in terms of the shape of batteries, the demand for prismatic secondary batteries or pouch-shaped secondary batteries that are thin enough to be applied to products, such as cellular phones, is very high. In terms of the material for batteries, on the other hand, the demand for lithium secondary batteries, such as lithium ion batteries or lithium ion polymer batteries, which exhibit high energy density, discharge voltage, and output stability, is also very high.

In addition, secondary batteries may be classified based on the structure of an electrode assembly, which has a structure in which a positive electrode and a negative electrode are stacked in the state in which a separator is interposed between the positive electrode and the negative electrode. Typically, the electrode assembly may be configured to have a jelly-roll (wound) type structure in which a long sheet type positive electrode and a long sheet type negative electrode are wound in the state in which a separator is disposed between the positive electrode and the negative electrode or a stacked type structure in which a plurality of positive electrodes and a plurality of negative electrodes, each of which has a predetermined size, are sequentially stacked in the state in which a plurality of separators is disposed respectively between the positive electrodes and the negative electrodes. In recent years, in order to solve problems with the jelly-roll type electrode assembly and the stacked type electrode assembly, there has been developed a stacked/folded type electrode assembly, which is a combination of the jelly roll type electrode assembly and the stacked type electrode assembly, having an improved structure in which a predetermined number of positive electrodes and a predetermined number of negative electrodes are sequentially stacked in the state in which a predetermined number of separators are disposed respectively between the positive electrodes and the negative electrodes to constitute a unit cell, after which a plurality of unit cells is sequentially folded in the state of being placed on a separation film.

In addition, secondary batteries may be classified based on the shape of a battery case of each of the secondary batteries into a cylindrical battery, configured to have a structure in which an electrode assembly is mounted in a cylindrical metal can, a prismatic battery, configured to have a structure in which an electrode assembly is mounted in a prismatic metal can, and a pouch-shaped battery, configured to have a structure in which an electrode assembly is mounted in a pouch-shaped case made of a laminated aluminum sheet.

Particularly, in recent years, a lot of interest has been directed to a pouch-shaped battery configured to have a structure in which a stacked or stacked/folded type electrode assembly is mounted in a pouch-shaped battery case made of a laminated aluminum sheet because of low manufacturing costs, light weight, easy modification of the shape thereof, etc. In addition, the use of such a pouch-shaped battery has gradually increased.

Figure 1:
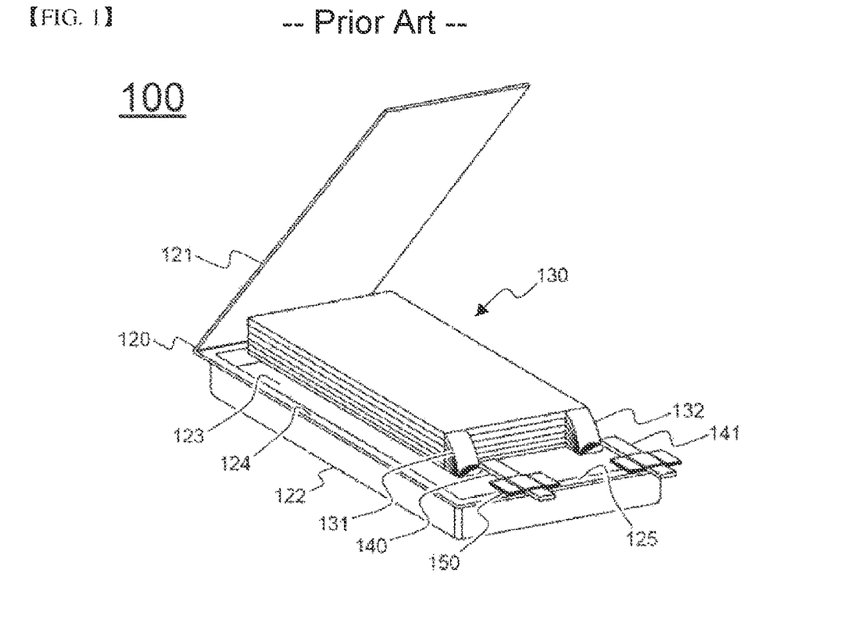
FIG. 1 is an exploded perspective view schematically showing the structure of a conventional pouch-shaped battery cell.

FIG. 1 is an exploded perspective view schematically showing the structure of a conventional pouch-shaped battery cell.

Referring to FIG. 1, a pouch-shaped battery cell 100 includes an electrode assembly 130, electrode tabs 131 and 132 extending from the electrode assembly 130, electrode leads 140 and 141 connected respectively to the electrode tabs 131 and 132 by welding, and a battery case 120 for receiving the electrode assembly 130.

The electrode assembly 130 is a power generating element including positive electrodes and negative electrodes sequentially stacked in the state in which separators are disposed respectively between the positive electrodes and the negative electrodes. The electrode assembly is configured to have a stacked type structure or a stacked/folded type structure. The electrode tabs 131 and 132 extend from corresponding electrode plates of the electrode assembly 130. The electrode leads 140 and 141 are electrically connected to the electrode tabs 131 and 132, extending from the corresponding electrode plates of the electrode assembly 130, respectively, for example, by welding. The electrode leads 140 and 141 are partially exposed outward from the battery case 120. In addition, insulating films 150 for improving sealability between the battery case 120 and the electrode leads 140 and 141 and, at the same time, securing electrical insulation between the battery case 120 and the electrode leads 140 and 141 are partially attached to the upper and lower surfaces of the electrode leads 140 and 141.

The battery case 120 includes a case body 122 having a concave receiving part 123, in which the electrode assembly 130 is mounted, and a cover 121 integrally connected to the case body 122. In the state in which the electrode assembly 130 is mounted in the receiving part 123, opposite sides 124 and upper ends 125 of the case body 122 and the cover 121, at which the case body 122 and the cover 121 contact each other, are coupled to each other, whereby the battery is completed. The battery case 120 is configured to have an aluminum laminate structure including an outer resin layer, a metal blocking layer, and a thermally-bondable resin sealant layer. Consequently, it is possible to bond the opposite sides 124 and the upper ends 125 of the case body 122 and the cover 121, which are in contact with each other, to each other by applying heat and pressure to the opposite sides 124 and the upper ends 125 of the case body 122 and the cover 121 so as to bond the resin layers thereof to each other, whereby sealed surplus portions are formed. At the opposite sides 124 of the case body 122 and the cover 121, the same resin layers of the upper and lower parts of the battery case 120 are directly attached to each other, whereby uniform sealing is achieved by bonding the opposite sides 124 of the case body 122 and the cover 121. On the other hand, the electrode leads 140 and 141 are located at the upper ends 125 of the case body 122 and the cover 121, while protruding outward from the battery case 120. For this reason, the upper ends 125 of the case body 122 and the cover 121 are thermally bonded in the state in which insulation films 150 are interposed between the electrode leads 140 and 141 and the battery case 120 in order to improve sealability considering the thickness of the electrode leads 140 and 141 and the difference in material between the electrode leads 140 and 141 and the battery case 120.

In general, the pouch-shaped battery cell having the above structure is electrically connected to an external device via the connection between the electrode tabs and the electrode leads.

In the above structure, however, the mobility of electrons and ions is low in the portion of the electrode assembly that is spaced apart from the electrode tabs, whereby the battery cell may be sufficiently utilized.

Furthermore, the above problem may become more serious in a structure in which the side of the electrode assembly from which the electrode tabs do not protrude is longer than the side of the electrode assembly from which the electrode tabs protrude when is viewed in a plan view, particularly in a structure in which a portion of the electrode assembly is spaced apart from the electrode tabs. Such nonuniform utilization of the electrode assembly accelerates local degradation of the electrode, whereby the lifespan of the battery cell may be reduced, and the battery cell may be locally degraded. As a result, the safety of the electrode assembly may be reduced.

Therefore, there is an urgent necessity for technology that is capable of fundamentally solving the above problems.

DISCLOSURE

Technical Problem

Therefore, the present invention has been made to solve the above problems and other technical problems that have yet to be resolved.

As a result of a variety of extensive and intensive studies and experiments to solve the problems described above, the inventors of the present application have found that, in the case in which an electrode assembly is configured such that two or more electrode tabs are formed at a relatively long side of the electrode assembly and an electrode lead is coupled to the electrode tabs, as will be described below, it is possible to uniformly utilize all regions of the electrode assembly, unlike a conventional electrode assembly, in which the utilization of regions of the electrode assembly that are spaced from the electrode tabs is low, whereby it is possible to prevent the occurrence of a problem in which the lifespan of the electrode assembly, which is relatively long, is reduced due to nonuniform degradation of the electrode assembly and to solve a problem in which the safety of the electrode assembly is reduced due to local degradation of the electrode assembly, and thus the electrode assembly exhibits more excellent lifespan characteristics and safety even though the electrode assembly is long. The present invention has been completed based on these findings.

Technical Solution

In accordance with an aspect of the present invention, the above and other objects can be accomplished by the provision of an electrode assembly configured to have a rectangular structure including two long sides and two short sides when viewed in a plan view, wherein the electrode assembly includes positive electrode tabs protruding from two or more regions of a first long side that are spaced apart from each other, the first long side being one of the two long sides, and negative electrode tabs protruding from two or more regions of a second long side that are spaced apart from each other, the second long side being the other of the two long sides, and wherein the positive electrode tabs are coupled to a positive electrode lead, located at the first long side, whereas the negative electrode tabs are coupled to a negative electrode lead, located at the second long side.

Consequently, it is possible to uniformly utilize all regions of the electrode assembly, unlike a conventional electrode assembly, in which the utilization of regions of the electrode assembly that are spaced from the electrode tabs is low, whereby it is possible to prevent the occurrence of a problem in which the lifespan of the electrode assembly, which is relatively long, is reduced due to nonuniform degradation of the electrode assembly and to solve a problem in which the safety of the electrode assembly is reduced due to local degradation of the electrode assembly, and thus the electrode assembly exhibits a longer lifespan and increased safety even though the electrode assembly is long.

In a concrete example, the length of each of the long sides may be 200% or more of the length of each of the short sides.

That is, in the case in which the electrode assembly according to the present invention is configured to have a structure in which the ratio of each of the long sides to each of the short sides is high, it is possible to uniformly utilize the electrode assembly due to the electrode tabs that protrude from two or more regions of each of the long sides. In the case in which the electrode assembly is configured to have a structure in which the ratio of each of the long sides to each of the short sides is high, therefore, the electrode assembly may exhibit more desirable characteristics.

If the length of each of the long sides is less than 200% of the length of each of the short sides, there may be no or little problem occurring in the portion of the electrode assembly that is spaced apart from the electrode tabs, as previously described, even in the case in which the electrode tabs are formed at each of the short sides. In this case, there may be little or no effect that can be obtained from the structure of the electrode assembly according to the present invention.

In addition, the positive electrode tabs may protrude from three or more regions of the first long side that are spaced apart from each other by the same distance, and the negative electrode tabs may protrude from three or more regions of the second long side that are spaced apart from each other by the same distance.

Consequently, the distances from the positive electrode tabs to the respective regions of the electrode assembly and the distances from the negative electrode tabs to the respective regions of the electrode assembly are reduced, and the distances between adjacent electrode tabs become uniform. As a result, it is possible to uniformly utilize all regions of the electrode assembly, and therefore it is possible to effectively prevent partial degradation of the electrode assembly or local degradation of the electrode assembly.

Meanwhile, in order to maximize the above effect, the positive electrode tabs and the negative electrode tabs may protrude respectively from the first long side and the second long side so as to be opposite each other.

In a concrete example, the positive electrode lead may be perpendicularly bent in the state of being coupled to the positive electrode tabs such that one surface of the positive electrode lead faces the corresponding long side of the electrode assembly, and the negative electrode lead may be perpendicularly bent in the state of being coupled to the negative electrode tabs such that one surface of the negative electrode lead faces the corresponding long side of the electrode assembly.

That is, the positive electrode lead may be configured to have a structure in which one surface of the positive electrode lead is disposed in tight contact with the first long side of the electrode assembly, from which the positive electrode tabs protrude, and the negative electrode lead may be configured to have a structure in which one surface of the negative electrode lead is disposed in tight contact with the second long side of the electrode assembly, from which the negative electrode tabs protrude. When viewed from one of the short sides of the electrode assembly, therefore, the electrode tabs may be disposed so as to have an "11" shape.

Consequently, the planar size of the electrode assembly may be minimized, whereby it is possible to configure the electrode assembly so as to have a more compact structure. In addition, it is possible to maximize the spatial usability of a device to which the electrode assembly is applied, and at the same time it is possible to further increase the capacity or energy density of the electrode assembly compared to other electrode assemblies of the same size.

In this case, the width of the positive electrode lead in the direction in which the positive electrode tabs protrude may be 50% to 100% of the thickness of the electrode assembly, and the width of the negative electrode lead in the direction in which the negative electrode tabs protrude may be 50% to 100% of the thickness of the electrode assembly.

If the width of the positive electrode lead in the direction in which the positive electrode tabs protrude is less than 50% of the thickness of the electrode assembly and if the width of the negative electrode lead in the direction in which the negative electrode tabs protrude is less than 50% of the thickness of the electrode assembly, which means that the width of each of the positive electrode lead and the negative electrode lead is too small, there may not be sufficient space in which the positive electrode tabs are coupled to the positive electrode lead, and there may not be sufficient space in which the negative electrode tabs are coupled to the negative electrode lead, or resistance in the connections between the electrode tabs and the electrode leads may increase. As a result, the output of the electrode assembly may be reduced. In addition, the safety of the electrode assembly may be reduced due to the intense heat that is generated from the connections between the electrode tabs and the electrode leads.

On the other hand, if the width of the positive electrode lead in the direction in which the positive electrode tabs protrude is greater than 100% of the thickness of the electrode assembly and if the width of the negative electrode lead in the direction in which the negative electrode tabs protrude is greater than 100% of the thickness of the electrode assembly, which means that the width of each of the positive electrode lead and the negative electrode lead is larger than the thickness of the electrode assembly, each of the positive electrode lead and the negative electrode lead may protrude in the thickness direction of the electrode assembly. In this case, the shape of the electrode assembly may become nonuniform, whereby there may be limitations on the shape of the space of a device in which the electrode assembly is to be mounted. Furthermore, the portion of the positive electrode lead or the negative electrode lead that protrudes in the thickness direction of the electrode assembly may be easily damaged, whereby the durability of the electrode assembly may be reduced.

In addition, the positive electrode tabs may be coupled to the other surface of the positive electrode lead, which is located outside the positive electrode lead so as to be opposite the corresponding long side of the electrode assembly, and the negative electrode tabs may be coupled to the other surface of the negative electrode lead, which is located outside the negative electrode lead so as to be opposite the corresponding long side of the electrode assembly.

As previously described, the positive electrode lead may be perpendicularly bent in the state of being coupled to the positive electrode tabs such that one surface of the positive electrode lead faces the corresponding long side of the electrode assembly, and the negative electrode lead may be perpendicularly bent in the state of being coupled to the negative electrode tabs such that one surface of the negative electrode lead faces the corresponding long side of the electrode assembly.

Consequently, the other surface of the positive electrode lead, which is opposite the one surface of the positive electrode lead, may be located outside the positive electrode lead so as to be opposite the corresponding long side of the electrode assembly, and the other surface of the negative electrode lead, which is opposite the one surface of the negative electrode lead, may be located outside the negative electrode lead so as to be opposite the corresponding long side of the electrode assembly. The positive electrode tabs may be coupled to the other surface of the positive electrode lead, and the negative electrode tabs may be coupled to the other surface of the negative electrode lead.

As a result, predetermined tension may be generated in the positive electrode tabs and the negative electrode tabs. Consequently, it is possible to provide a more stable coupling structure than in the case in which the positive electrode tabs and the negative electrode tabs are coupled respectively to the one surface of the positive electrode lead, which is located inside the positive electrode lead, to the one surface of the negative electrode lead, which is located inside the negative electrode lead.

Meanwhile, the lengths that the positive electrode tabs protrude from the corresponding long side may continuously or discontinuously decrease from one of the positive electrode tabs, coupled to the other surface of the positive electrode lead so as to be adjacent thereto, to one of the positive electrode tabs, coupled to the other surface of the positive electrode lead so as to be spaced apart therefrom, and the lengths that the negative electrode tabs protrude from the corresponding long side may continuously or discontinuously decrease from one of the negative electrode tabs, coupled to the other surface of the negative electrode lead so as to be adjacent thereto, to one of the negative electrode tabs, coupled to the other surface of the negative electrode lead so as to be spaced apart therefrom.

More specifically, in the case in which the positive electrode tabs are coupled to the other surface of the positive electrode lead, some of the positive electrode tabs that are coupled to the other surface of the positive electrode lead so as to be adjacent thereto may be further spaced apart from the coupling region. In addition, in the case in which the negative electrode tabs are coupled to the other surface of the negative electrode lead, some of the negative electrode tabs that are coupled to the other surface of the negative electrode lead so as to be adjacent thereto may be further spaced apart from the coupling region.

Consequently, the distance from the corresponding long side to the coupling region may gradually decrease from one of the positive electrode tabs, coupled to the other surface of the positive electrode lead so as to be adjacent thereto, to one of the positive electrode tabs, coupled to the other surface of the positive electrode lead so as to be spaced apart therefrom, whereby the lengths that the positive electrode tabs protrude from the corresponding long side may continuously or discontinuously decrease from one of the positive electrode tabs, coupled to the other surface of the positive electrode lead so as to be adjacent thereto, to one of the positive electrode tabs, coupled to the other surface of the positive electrode lead so as to be spaced apart therefrom. In addition, the distance from the corresponding long side to the coupling region may gradually decrease from one of the negative electrode tabs, coupled to the other surface of the negative electrode lead so as to be adjacent thereto, to one of the negative electrode tabs, coupled to the other surface of the negative electrode lead so as to be spaced apart therefrom, whereby the lengths that the negative electrode tabs protrude from the corresponding long side may continuously or discontinuously decrease from one of the negative electrode tabs, coupled to the other surface of the negative electrode lead so as to be adjacent thereto, to one of the negative electrode tabs, coupled to the other surface of the negative electrode lead so as to be spaced apart therefrom. Consequently, it is possible to minimize the deformation of the electrode tabs that occurs between each of the long sides of the electrode assembly and one surface of a corresponding one of the electrode leads, whereby it is possible to eliminate or minimize a problem that may occur due to damage to the electrode tabs. In addition, it is possible to minimize the size of a space that is occupied by the electrode tabs located between each of the long sides of the electrode assembly and one surface of a corresponding one of the electrode leads in the state of overlapping each other, whereby it is possible to minimize the size of the electrode assembly.

In a concrete example, an insulating material may be added to the one surface of the positive electrode lead, which is located inside the positive electrode lead so as to face the corresponding long side of the electrode assembly, and an insulating material may be added to the one surface of the negative electrode lead, which is located inside the negative electrode lead so as to face the corresponding long side of the electrode assembly.

As a result, the insulation properties of the positive electrode lead and the negative electrode lead are improved. Consequently, it is possible to effectively prevent an internal short circuit that may occur as the result of the one surface of the positive electrode lead being brought into contact with a negative electrode, which has a polarity different from the polarity of the positive electrode lead, at the corresponding long side of the electrode assembly. In addition, it is possible to effectively prevent an internal short circuit that may occur as the result of the one surface of the negative electrode lead being brought into contact with a positive electrode, which has a polarity different from the polarity of the negative electrode lead, at the corresponding long side of the electrode assembly.

The insulating material may be, but is not limited to, an insulating tape or an insulative coating layer. The composition or the structure of the insulating material is not particularly restricted, as long as the insulating material can be stably coupled to one surface of the positive electrode lead and to one surface of the negative electrode lead and is capable of exhibiting sufficient insulation properties.

In addition, one-side end of the positive electrode lead and one-side end of the negative electrode lead may extend toward the same short side and then protrude outward from the same short side, and the one-side end of the positive electrode lead and the one-side end of the negative electrode lead may extend toward different short sides and then protrude outward from the different short sides.

That is, the positive electrode lead and the negative electrode lead extend toward the short side(s) of the electrode assembly and then protrude outward from the short side(s) of the electrode assembly in the state of being coupled respectively to the positive electrode tabs, which protrude from the corresponding long side, and to the negative electrode tabs, which protrude from the corresponding long side, in order to form a positive electrode terminal and a negative electrode terminal, respectively. In this case, the positive electrode lead and the negative electrode lead may extend toward the same short side and then protrude outward from the same short side, or may extend toward different short sides and then protrude outward from the different short sides. As a result, both a positive electrode terminal and a negative electrode terminal may be formed at the same short side. Alternatively, a positive electrode terminal may be formed at one of the short sides, which are opposite each other, and a negative electrode terminal may be formed at the other short side.

In addition, the positive electrode lead and the negative electrode lead may extend toward both the short sides and then protrude outward from both the short sides, depending on the desired purpose and structure of the electrode assembly, in order to form two positive electrode terminals and two negative electrode terminals, to form two positive electrode terminals and one negative electrode terminal, or to form one positive electrode terminal and two negative electrode terminals.

Meanwhile, the electrode assembly may be configured to have a structure in which a positive electrode and a negative electrode are stacked in the state in which a separator is interposed between the positive electrode and the negative electrode.

Alternatively, the electrode assembly may be configured to have a structure in which two or more unit cells, each of which is configured to have a structure in which a positive electrode and a negative electrode are stacked in the state in which a separator is interposed between the positive electrode and the negative electrode, are laminated.

In other words, the electrode assembly may be configured to have a stacked type structure or a laminated and stacked type structure, in which the electrode tabs protrude from two or more regions of the long sides that are spaced apart from each other. Consequently, it is possible to more easily form a structure in which the electrode tabs protrude.

However, the structure of the electrode assembly is not particularly restricted, as long as the electrode assembly can be configured to have a structure in which the electrode tabs protrude from two or more regions of the long sides that are spaced apart from each other so as to be coupled to corresponding electrode leads. More specifically, the electrode assembly may be configured to have a wound type structure, in which a positive electrode sheet and a negative electrode sheet are wound in one direction in the state in which a separator sheet is interposed between the positive electrode sheet and the negative electrode sheet, or to have a stacked and folded type structure, in which a plurality of unit cells is wound in one direction in the state of being disposed on a single separator sheet.

In accordance with another aspect of the present invention, there is provided a battery cell including the electrode assembly received in a battery case. The battery case may be a prismatic case made of a metal can or a pouch-shaped case including a metal layer and a resin layer.

The remaining structure of the electrode assembly excluding the above structure is well known in the art to which the present invention pertains, and a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 2:
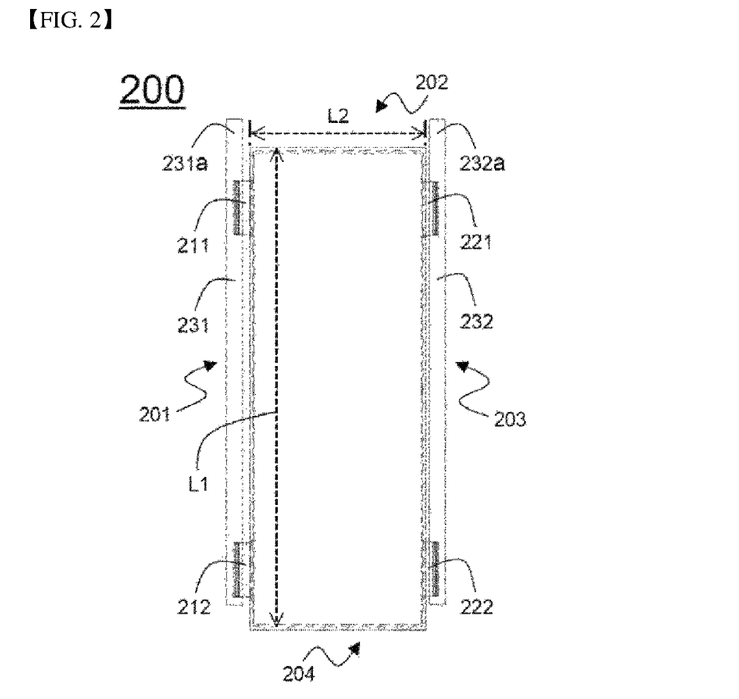
FIG. 2 is a view schematically showing the structure of an electrode assembly according to an embodiment of the present invention.

FIG. 2 is a view schematically showing the structure of an electrode assembly according to an embodiment of the present invention.

Referring to FIG. 2, an electrode assembly 200 is configured to have a rectangular structure including two long sides 201 and 203 and two short sides 202 and 204 when viewed in a plan view.

Positive electrode tabs 211 and 212 protrude from two regions of the first long side 201, which are spaced apart from each other, and negative electrode tabs 221 and 222 protrude from two regions of the second long side 203, which are spaced apart from each other.

The positive electrode tabs 211 and 212 and the negative electrode tabs 221 and 222 protrude respectively from the first long side 201 and the second long side 203 so as to be opposite each other.

A positive electrode lead 231 and a negative electrode lead 232 are located respectively at the first long side 201 and the second long side 203. The positive electrode tabs 211 and 212 are coupled to the positive electrode lead 231, and the negative electrode tabs 221 and 222 are coupled to the negative electrode lead 232.

The length of each of the long sides 201 and 203 is set to be about 270% of the length of each of the short sides 202 and 204.

One-side end 231a of the positive electrode lead 231 and one-side end 232a of the negative electrode lead 232 extend toward the first short side 202 and then protrude outward from the first short side 202.

In the electrode assembly 200, therefore, electrons that are concentrated on the electrode tabs 211, 212, 221, and 222 may be dispersed, in contrast with a conventional electrode assembly configured to have a structure in which the positive electrode tabs and the negative electrode tabs are formed at the first short side 202 or the second short side 204. Consequently, it is possible to prevent an increase in resistance due to the concentration of electrons, whereby it is possible to effectively prevent the occurrence of a problem related to output reduction and a problem related to safety reduction.

Figure 3:
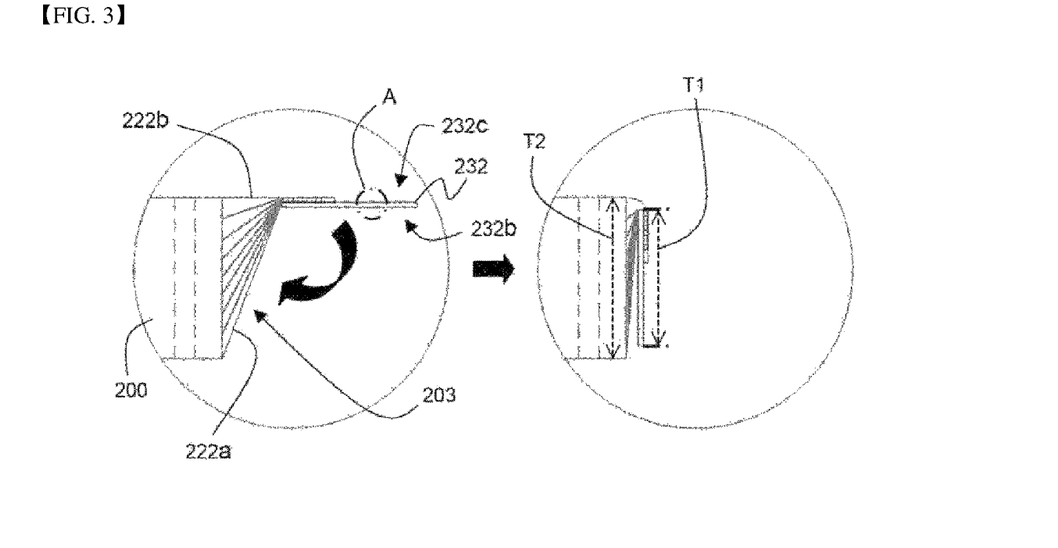
FIG. 3 is a view schematically showing the vertical sectional structure of a negative electrode lead of FIG. 2.

FIG. 3 is a view schematically showing the vertical sectional structure of the negative electrode lead of FIG. 2.

Referring to FIG. 3, the negative electrode lead 232 is perpendicularly bent in the state of being coupled to negative electrode tabs 222a and 222b such that one surface 232b of the negative electrode lead 232 faces the second long side 203 of the electrode assembly 200.

The negative electrode tabs 222a and 222b are coupled to the other surface 232c of the negative electrode lead 232, which is located outside the negative electrode lead 232 so as to be opposite the second long side 203 of the electrode assembly 200.

The lengths that the negative electrode tabs 222a and 222b protrude from the second long side 203 gradually decrease from the negative electrode tab 222a coupled to the other surface 232c of the negative electrode lead 232 so as to be adjacent thereto to the negative electrode tab 222b coupled to the other surface 232c of the negative electrode lead 232 so as to be spaced apart therefrom.

Consequently, it is possible to minimize the deformation of the negative electrode tabs 222a and 222b that occurs between the second long side 203 of the electrode assembly 200 and the one surface 232b of the negative electrode lead 232, whereby it is possible to eliminate or minimize a problem that may occur due to damage to the negative electrode tabs 222a and 222b. In addition, it is possible to minimize the size of a space that is occupied by the negative electrode tabs 222a and 222b located between the second long side 203 of the electrode assembly 200 and the one surface 232b of the negative electrode lead 232 in the state of overlapping each other, whereby it is possible to minimize the size of the electrode assembly 200.

The width T1 of the negative electrode lead 232 is set to be about 85% of the thickness T2 of the electrode assembly 200.

Consequently, it is possible to provide a sufficient space in which to couple the negative electrode tabs 222a and 222b led to the negative electrode lead 232. At the same time, it is possible to prevent the occurrence of a phenomenon in which the negative electrode lead 232 protrudes upward and downward from the electrode assembly 200 in the state in which the negative electrode lead 232 is in tight contact with the second long side 203 of the electrode assembly 200, whereby it is possible to more uniformly form the outer surface of the electrode assembly 200.

Figure 4:
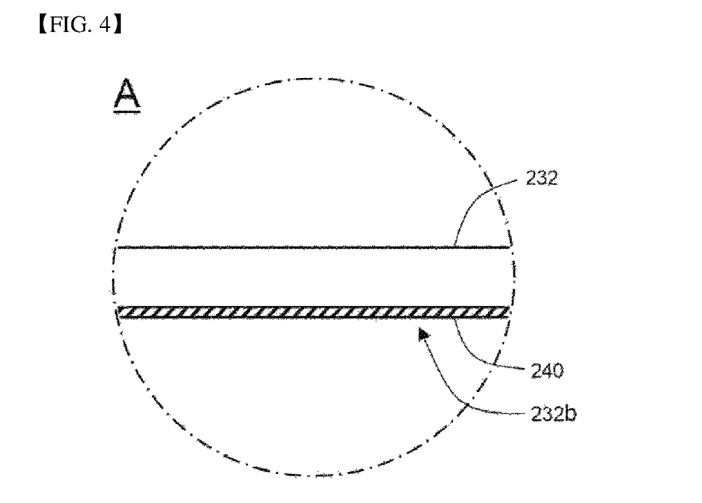
FIG. 4 is an enlarged view schematically showing the structure of part A of FIG. 3.

FIG. 4 is an enlarged view schematically showing the structure of part A of FIG. 3.

Referring to FIG. 4 together with FIG. 3, an insulating tape 240 is attached to the one surface 232b of the negative electrode lead 232, which is located inside the negative electrode lead 232 so as to face the second long side 203 of the electrode assembly 200.

As a result, insulation properties between the second long side 203 of the electrode assembly 200 and the negative electrode lead 232 are improved. Consequently, it is possible to effectively prevent an internal short circuit that may occur as the result of the one surface 232b of the negative electrode lead 232 being brought into contact with a positive electrode, which has a polarity different from the polarity of the negative electrode lead 232, at the second long side 203 of the electrode assembly 200.

The insulating tape 240 may be a double-sided insulating tape, which improves the force of adhesion between the second long side 203 of the electrode assembly 200 and the negative electrode lead 232.

Figure 5:
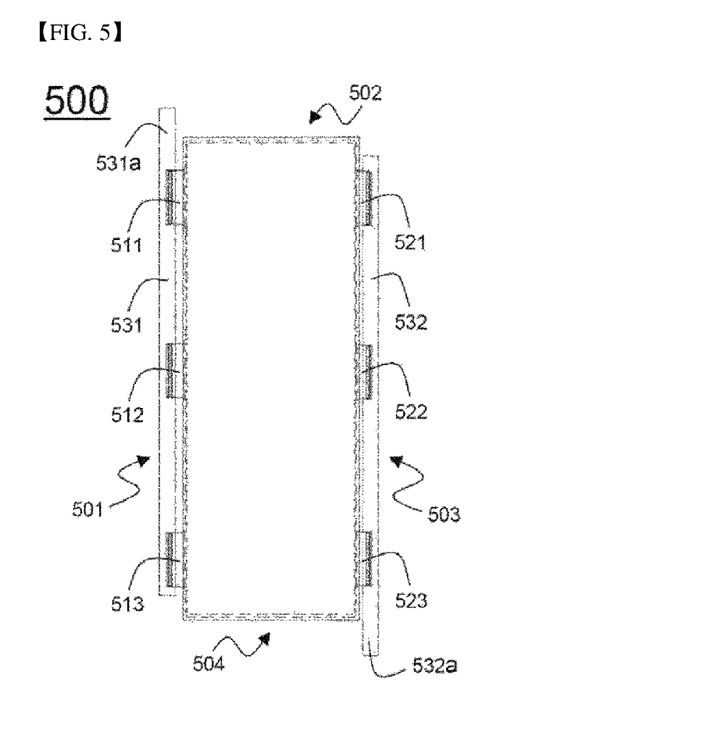
FIG. 5 is a view schematically showing the structure of an electrode assembly according to another embodiment of the present invention.

FIG. 5 is a view schematically showing the structure of an electrode assembly according to another embodiment of the present invention.

Referring to FIG. 5, an electrode assembly 500 is configured to have a structure in which positive electrode tabs 511, 512, and 513 protrude from three regions of a first long side 501 that are spaced apart from each other and in which negative electrode tabs 521, 522, and 523 protrude from three regions of a second long side 503 that are spaced apart from each other. The positive electrode tabs 511, 512, and 513 and the negative electrode tabs 521, 522, and 523 protrude respectively from the first long side 501 and the second long side 503 so as to be opposite each other.

A positive electrode lead 531 and a negative electrode lead 532 are coupled respectively to the positive electrode tabs 511, 512, and 513 and the negative electrode tabs 521, 522, and 523 at the first long side 501 and the second long side 503 of the electrode assembly 500. One-side end 531a of the positive electrode lead 531 extends toward a first short side 502 and then protrudes outward from the first short side 502. The other-side end 532a of the negative electrode lead 532 extends toward a second short side 504 and then protrudes outward from the second short side 504.

The remaining structure of the electrode assembly excluding the above structure is identical to that of the electrode assembly of FIG. 2, and therefore a detailed description thereof will be omitted.

MODE FOR INVENTION

Hereinafter, the present invention will be described in more detail with reference to the following examples. It should be noted, however, that the scope of the present invention is not limited by the examples.

Manufacture of Electrode Assembly

REFERENCE EXAMPLE

Positive electrodes and negative electrodes were stacked in the state in which separators are interposed respectively between the positive electrodes and the negative electrodes in order to manufacture an electrode assembly configured to have a rectangular structure when viewed in a plan view, configured to have a structure in which the length of each long side is 130% of the length of each short side, and configured to have a structure in which a positive electrode tab and a negative electrode tab are formed at one of the short sides so as to be spaced apart from each other.

Example 1

Positive electrodes and negative electrodes were stacked in the state in which separators are interposed respectively between the positive electrodes and the negative electrodes in order to manufacture an electrode assembly configured to have a rectangular structure when viewed in a plan view, configured to have a structure in which the length of each long side is 270% of the length of each short side, and configured to have a structure in which a positive electrode tab is formed at the middle of one of the long sides and a negative electrode tab is formed at the middle of the other long side.

Example 2

Positive electrodes and negative electrodes were stacked in the state in which separators are interposed respectively between the positive electrodes and the negative electrodes in order to manufacture an electrode assembly configured to have a rectangular structure when viewed in a plan view, configured to have a structure in which the length of each long side is 270% of the length of each short side, configured to have a structure in which three positive electrode tabs are formed at the middle of one of the long sides and three negative electrode tabs are formed at the middle of the other long side, and configured to have a structure in which a single positive electrode lead is simultaneously coupled to the positive electrode tabs and a single negative electrode lead is simultaneously coupled to the negative electrode tabs.

Comparative Example 1

An electrode assembly was manufactured so as to have the same capacity and size as the electrode assembly manufactured according to Example 1 except that a positive electrode tab and a negative electrode tab are formed at one of the short sides so as to be spaced apart from each other.

Manufacture of Battery Cell

Each of the electrode assemblies manufactured according to Example 1 and Comparative Example 1 was received in a battery case together with an electrolytic solution such that the electrode assembly was impregnated with the electrolytic solution, and then the battery case was sealed in order to manufacture a pouch-shaped battery cell.

Experimental Example 1

Analysis of Resistance

The capacity, resistance, total positive electrode area, and discharge area resistivity of each of the battery cells including the electrode assemblies manufactured according to Example 1 and Comparative Example 1 were measured. The results are shown in Table 1.

TABLE 1

|  | Reference Example | Comparative Example 1 | Example 1 | Example 2 |
|---|---|---|---|---|
| Capacity (Ah, 0.33C) | 45 | 95 | 95 | 95 |
| Resistance $R_{dis}$ (mOhm, SOC50, 10 s) | 2.654 | 1.088 | 0.9 | 0.78 |
| Total positive electrode area (m$^2$) | 0.740 | 2.665 | 2.665 | 2.665 |
| Discharge area resistivity (mOhm × m$^2$, SOC50, 10 s) | 1.964 | 2.899 | 2.399 | 2.079 |

It can be seen from Table 1 that, in the case in which the length of each long side is 270% of the length of each short side, the capacity and the total positive electrode area of the battery cell including the electrode assembly manufactured according to Example 1, in which the electrode tabs are formed at the long sides, are equal to the capacity and the total positive electrode area of the battery cell including the electrode assembly manufactured according to Comparative Example 1, in which the electrode tabs are formed at one of the short sides, but the resistance and the discharge area resistivity of the battery cell including the electrode assembly manufactured according to Example 1 are smaller than the resistance and the discharge area resistivity of the battery cell including the electrode assembly manufactured according to Comparative Example 1. This indicates that the distances from the electrode tabs to respective regions of the electrode assembly manufactured according to Example 1 are shorter than the distances from the electrode tabs to respective regions of the electrode assembly manufactured according to Comparative Example 1, whereby the resistance of the battery cell including the electrode assembly manufactured according to Example 1 is reduced and thus it is possible to prevent a reduction in the output of the battery cell including the electrode assembly.

In addition, it can be seen that the discharge area resistivity of the battery cell including the electrode assembly manufactured according to Example 2, in which three positive electrode tabs are formed at each of the long sides is similar to the discharge area resistivity of the battery cell including the electrode assembly manufactured according to Reference Example, in which the length of each long side is 130% of the length of each short side.

Therefore, in the case in which, in an electrode assembly configured to have a structure in which the length of each long side is 200% or more of the length of each short side, the electrode tabs are formed at each of the long sides, more specifically, at two or more regions of each of the long sides that are spaced apart from each other, and the distances from the electrode tabs to respective regions of the electrode assembly are shortened, whereby the discharge area resistivity of a battery cell including the electrode assembly is reduced. Consequently, it can be easily seen that it is possible to improve the output characteristics of the battery cell.

Experimental Example 2

Analysis of Capacity Retention Rate

Each of the battery cells including the electrode assemblies manufactured according to Example 1 and Comparative Example 1 was charged and discharged for 500 cycles in a CC/CV mode having an upper limit voltage of 4.25 V at a room temperature of 25 t, and then the capacity retention rate of each of the battery cells was measured. The results are shown in Table 2.

TABLE 2

| | Remaining capacity after 1 cycle (%) | Remaining capacity after 500 cycles (%) |
|---|---|---|
| Example 1 | 99.9 | 87.2 |
| Comparative Example 1 | 99.9 | 73.5 |

It can be seen from Table 2 that all regions of the electrode assembly manufactured according to Example 1 are uniformly utilized, compared to the electrode assembly manufactured according to Comparative Example 1, whereby the capacity retention rate of the battery cell including the electrode assembly manufactured according to Example 1 is 87.2% or more after 500 cycles. On the other hand, it can be seen that utilization of the regions of the electrode assembly manufactured according to Comparative Example 1 that are spaced apart from the short side at which the electrode tabs are located is reduced, whereby local degradation of the electrode assembly is accelerated. As a result, it can be seen that the capacity retention rate of the battery cell including the electrode assembly manufactured according to Comparative Example 1 is 73.5%, which is lower than the capacity retention rate of the battery cell including the electrode assembly manufactured according to Example 1.

Therefore, in the case in which, in an electrode assembly configured to have a structure in which the length of each long side is 200% or more of the length of each short side, the electrode tabs are formed at each of the long sides, making it possible to uniformly utilize all regions of the electrode assembly. Consequently, it can be easily seen that it is possible to improve the lifespan characteristics of the battery cell.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, an electrode assembly according to the present invention is configured such that two or more electrode tabs are formed at a relatively long side of the electrode assembly and an electrode lead is coupled to the electrode tabs. Consequently, it is possible to uniformly utilize all regions of the electrode assembly, unlike a conventional electrode assembly, in which the utilization of regions of the electrode assembly that are spaced from the electrode tabs is low, whereby it is possible to prevent the occurrence of a problem in which the lifespan of the electrode assembly, which is relatively long, is reduced due to nonuniform degradation of the electrode assembly and to solve a problem in which the safety of the electrode is reduced due to local degradation of the electrode assembly, and thus the electrode assembly exhibits more excellent lifespan characteristics and safety even though the electrode assembly is long.

The invention claimed is:
1. A battery cell, comprising:
an electrode assembly received in a pouch-shaped battery case comprising a metal layer and a resin layer, each of the electrode assembly and the battery case having a respective rectangular structure having first and second long sides extending in a first direction and first and second short sides extending in a second direction perpendicular to the first direction when viewed in a plan view;
the electrode assembly including:
positive electrode tabs protruding from two or more spaced-apart regions of the first long side, the two or more spaced-apart regions of the first long side being spaced apart from one another in the first direction;
negative electrode tabs protruding from two or more spaced-apart regions of the second long side, the two or more spaced-apart regions of the second long side being spaced apart from one another in the first direction;

a positive electrode lead located at the first long side and coupled to the positive electrode tabs; and a negative electrode lead located at the second long side and coupled to the negative electrode tabs, wherein a first planar surface of the positive electrode lead is oriented perpendicularly to a top planar surface of the rectangular structure within the battery case, such that the first planar surface of the positive electrode lead faces the first long side of the electrode assembly, and wherein a first planar surface of the negative electrode lead is oriented perpendicularly to the top planar surface of the rectangular structure, such that the first planar surface of the negative electrode lead faces the second long side of the electrode assembly, wherein the positive electrode tabs are coupled to a second planar surface of the positive electrode lead opposite the first planar surface of the positive electrode lead and facing away from the first long side of the electrode assembly, and wherein the negative electrode tabs are coupled to a second planar surface of the negative electrode lead opposite the first planar surface of the negative electrode lead and facing away from the second long side of the electrode assembly, and wherein an insulating material is added to the first planar surface of the positive electrode lead between the first planar surface of the positive electrode lead and a longest one of the positive electrode tabs, and wherein the insulating material is added to the first planar surface of the negative electrode lead between the first planar surface of the negative electrode lead and a longest one of the negative electrode tabs.

2. The battery cell according to claim 1, wherein a length of each of the long sides is 200% or more of a length of each of the short sides.

3. The battery cell according to claim 1, wherein the positive electrode tabs protrude from three or more of the spaced-apart regions of the first long side that are spaced apart from each other by a same distance, and wherein the negative electrode tabs protrude from three or more of the spaced-apart regions of the second long side that are spaced apart from each other by the same distance.

4. The battery cell according to claim 1, wherein the positive electrode tabs are disposed at locations along the first long side that are directly opposite locations along the second long side at which the negative electrode tabs are disposed.

5. The battery cell according to claim 1, wherein a width of the first planar surface of the positive electrode lead is 50% to 100% of a thickness of the electrode assembly in a height direction perpendicular to the top planar surface of the rectangular structure, and wherein a width of the first planar surface of the negative electrode lead is 50% to 100% of the thickness of the electrode assembly.

6. The battery cell according to claim 1, wherein at each of the spaced-apart regions of the first long side of the electrode assembly, the positive electrode tabs are arranged such that the positive electrode tabs are longest at a bottom planar surface of the rectangular structure opposite the top planar surface of the rectangular structure, and shortest at the top planar surface of the rectangular structure, and wherein at each of the spaced-apart regions of the second long side of the electrode assembly, the negative electrode tabs are arranged such that the negative electrode tabs are longest at the bottom planar surface of the rectangular structure and shortest at the top planar surface of the rectangular structure.

7. The battery cell electrode assembly according to claim 1, wherein the insulating material is an insulating tape or an insulative coating layer.

8. The battery cell according to claim 1, wherein a longitudinal end of the positive electrode lead and a longitudinal end of the negative electrode lead extend toward a same one of the short sides and protrude outward from the same one of the short sides.

9. The battery cell according to claim 1, wherein the rectangular structure of the electrode assembly includes a positive electrode and a negative electrode stacked in a state in which a separator is interposed between the positive electrode and the negative electrode, the positive electrode comprising the positive electrode tabs protruding from the first long side, and the negative electrode comprising the negative electrode tabs protruding from the second long side.

10. The battery cell according to claim 1, wherein the electrode assembly comprises two or more unit cells laminated to one another, each of the unit cells having a structure in which a positive electrode and a negative electrode are stacked in a state in which a separator is interposed between the positive electrode and the negative electrode, the positive electrode of each unit cell being coupled to a respective one of the positive electrode tabs, the negative electrode of each unit cell being coupled to a respective one of the negative electrode tabs.

11. The battery cell according to claim 1, wherein a longitudinal end of the positive electrode lead and a longitudinal end of the negative electrode lead extend toward different ones of the short sides and protrude outward from the different ones of the short sides.

* * * * *